(12) United States Patent
Van Dijk

(10) Patent No.: US 7,713,460 B2
(45) Date of Patent: May 11, 2010

(54) METHOD AND APPARATUS FOR MANUFACTURING OF PLASTIC-BASED COMPOSITE PRODUCT

(75) Inventor: Dirk Van Dijk, Beneden (GB)

(73) Assignee: Tech-Wood International Ltd., St. Peter Port, Guernsey (GB)

( * ) Notice: Subject to any disclaimer, the term of this patent is extended or adjusted under 35 U.S.C. 154(b) by 314 days.

(21) Appl. No.: 11/555,475

(22) Filed: Nov. 1, 2006

(65) Prior Publication Data

US 2007/0063373 A1 Mar. 22, 2007

Related U.S. Application Data

(63) Continuation-in-part of application No. 10/861,112, filed on Jun. 4, 2004, now abandoned, which is a continuation of application No. 09/171,910, filed on Mar. 18, 1999, now Pat. No. 6,929,841.

(30) Foreign Application Priority Data

Apr. 27, 1995 (WO) .................. PCT/NL95/00153

(51) Int. Cl.
*B29C 47/60* (2006.01)
(52) U.S. Cl. .................. 264/211.23; 264/122; 425/461
(58) Field of Classification Search ................ 264/40.6, 264/45.3, 122, 165, 175, 176.1, 177.16, 211.21, 264/211.23; 425/461
See application file for complete search history.

(56) References Cited

U.S. PATENT DOCUMENTS

| 3,770,859 | A | 11/1973 | Bevan |
| 4,187,352 | A | 2/1980 | Klobbie |
| 4,380,522 | A | 4/1983 | Georlette et al. |
| 4,559,262 | A | 12/1985 | Cogswell et al. |
| 4,866,110 | A | 9/1989 | Lee |
| 5,030,662 | A | 7/1991 | Banerjie |
| 5,082,605 | A | 1/1992 | Brooks et al. |
| 5,096,406 | A | 3/1992 | Brooks et al. |
| 5,273,819 | A | 12/1993 | Jex |
| 5,401,154 | A | 3/1995 | Sargent |
| 5,474,722 | A * | 12/1995 | Woodhams ................ 264/45.3 |
| 5,882,564 | A * | 3/1999 | Puppin .................. 264/177.16 |

FOREIGN PATENT DOCUMENTS

DE 28 11 795 A1 10/1978

(Continued)

OTHER PUBLICATIONS

The Dictionary of Fiber & Textile Technology, pp. 15, 83, 96, 106, and 176, KoSa, Charlotte, NC.

*Primary Examiner*—Joseph S Del Sole
*Assistant Examiner*—Stephen Sollenberger
(74) *Attorney, Agent, or Firm*—Smith & Gambrell & Russell LLP

(57) ABSTRACT

A method of preparing a plastic-based composite profile comprised of a plastic mass containing a plurality of wood particles embedded in the plastic mass by bringing a plurality of dried wood particles and a thermoplastic polymer together with optional additives together to form a plastic-wood particle mixture, blending the plastic-wood particle mixture in blending means at a temperature sufficiently high to at least partially melt the thermoplastic polymer so as to be capable of uniformly blending with the wood particles to form a blended plastic-wood particle mass constituting an initial agglomerate; transforming the initial agglomerate into a profile preform by subjecting the agglomerate to the action of a double screw multi-zone extrusion means thereby shaping the profile preform into a profile by pushtrusion so that the agglomerate flows under pressure as a plastic plug flow in the extrusion means and through orientation and shaping stages to thereby obtain the composite profile.

13 Claims, 3 Drawing Sheets

FOREIGN PATENT DOCUMENTS

| | | |
|---|---|---|
| EP | 0 008 143 A1 | 2/1980 |
| EP | 0 114 409 A1 | 8/1984 |
| EP | 0 319 589 A1 | 6/1989 |
| EP | 0 591 801 A1 | 4/1994 |
| GB | 1 587 894 | 4/1981 |
| JP | 59-217743 | 12/1984 |
| JP | 60-069161 | 4/1985 |
| JP | 02-098429 | 4/1990 |
| JP | 06-279615 | 10/1994 |
| NL | 7704265 | 10/1978 |
| NL | 9302125 | 7/1995 |
| NL | 9400308 | 7/1995 |
| SU | 1100288 A | 6/1984 |
| WO | WO 90/08020 | 7/1990 |

* cited by examiner

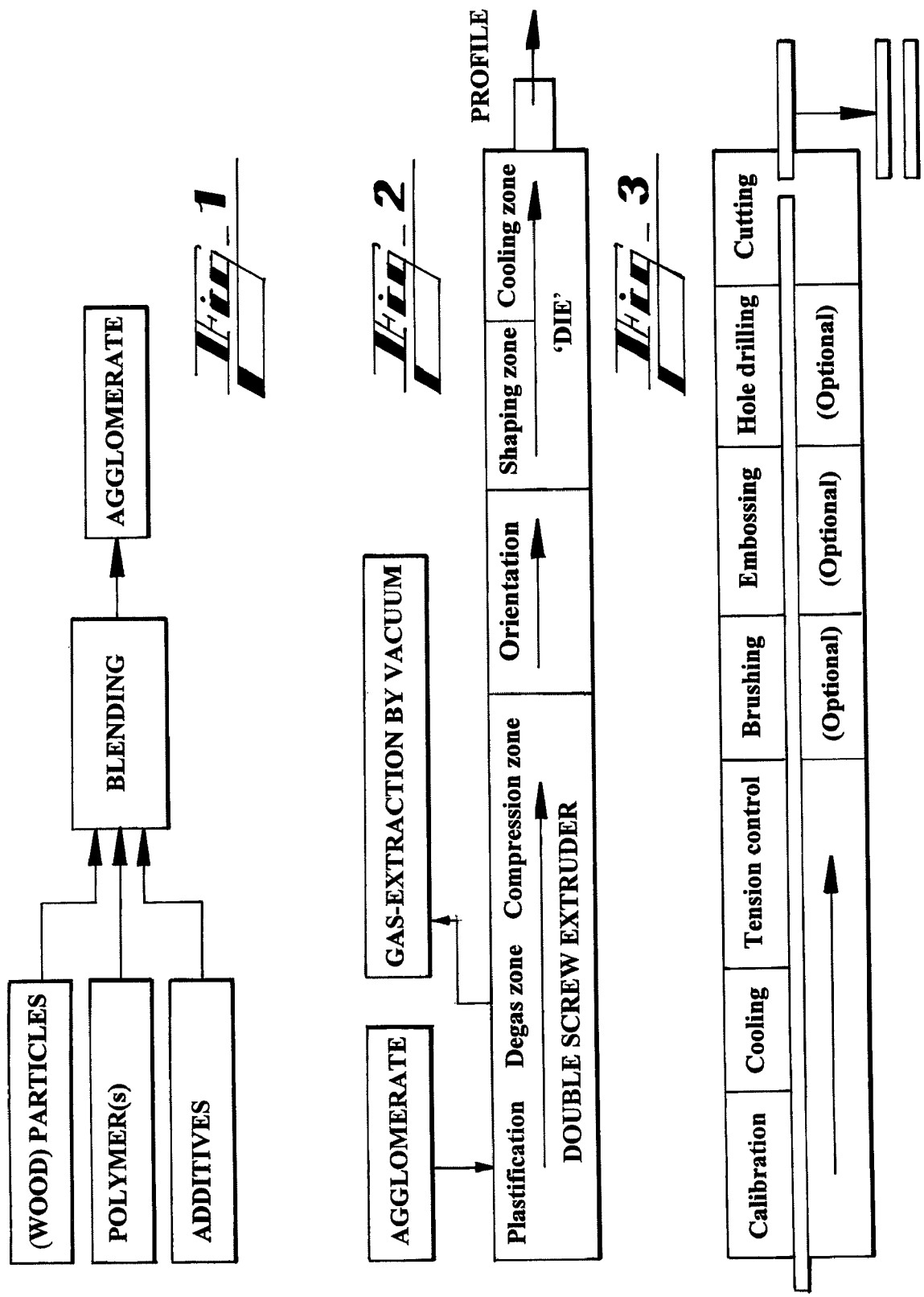

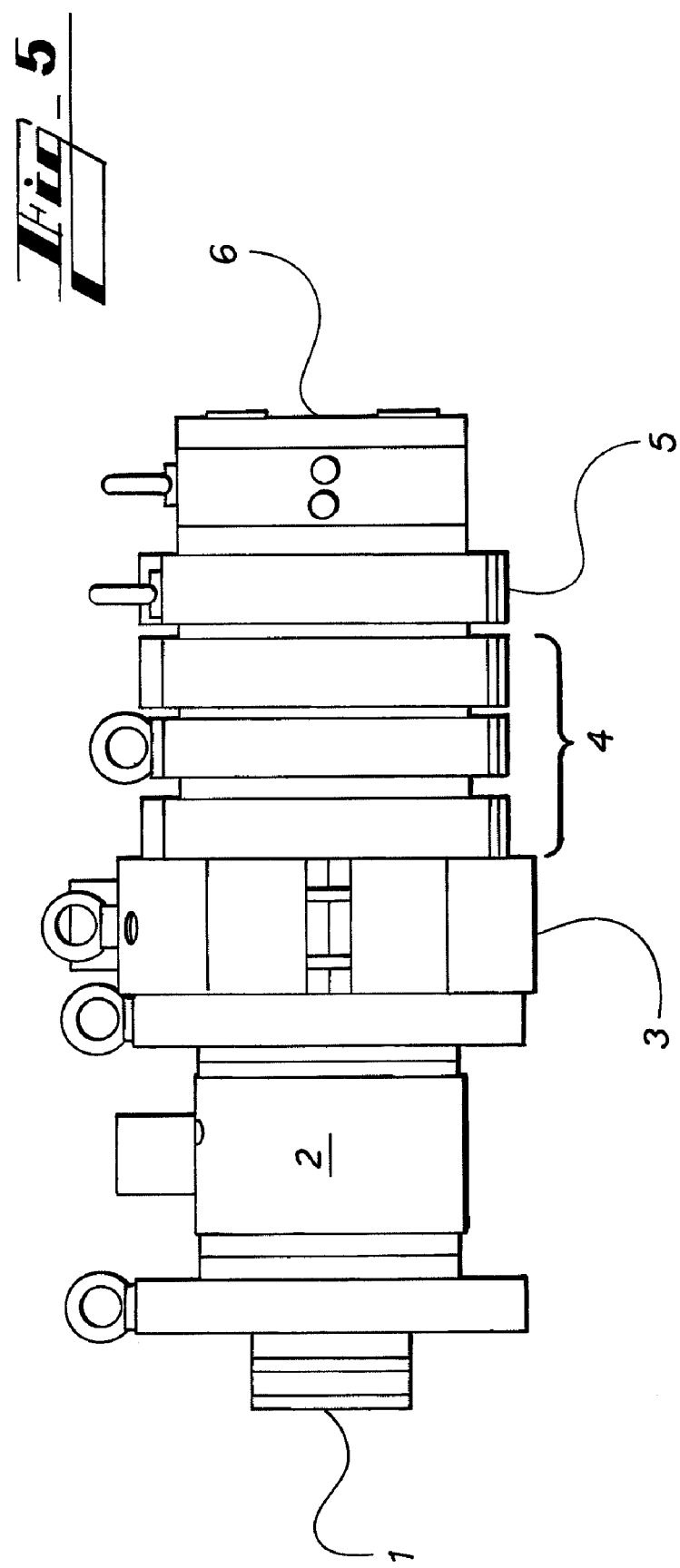
Fig_5

METHOD AND APPARATUS FOR MANUFACTURING OF PLASTIC-BASED COMPOSITE PRODUCT

REFERENCE TO RELATED APPLICATIONS

This application is a continuation-in-part of application Ser. No. 10/861,112 filed Jun. 4, 2004, now abandoned, which in turn is a continuation of application Ser. No. 09/171,910 of Mar. 18, 1999, with an International Filing Date of Apr. 27, 1995, now U.S. Pat. No. 6,929,841, which in turn is based on PCT application PCT/NL95/00153 filed Apr. 27, 1995, now WO 96/34045, all of which are relied on and incorporated herein by reference.

INTRODUCTION AND BACKGROUND

The invention relates to a method for making a plastic-based composite product which comprises at least partially of a plastic in which a material consisting substantially of particles is homogeneously embedded, which particles have tensile strength in at least one principal direction.

It is an object of the invention to provide a method for producing a plastic-based composite product which can be manufactured at low cost but which nevertheless meets high standards which may be required in respect of various properties. Such properties can relate for instance to high mechanical properties, weather resistance, nonageing properties and the like. Another object of this invention is an apparatus for carrying out the aforesaid method.

SUMMARY OF THE INVENTION

With a view to the above, the invention provides a method for producing a plastic-based composite product containing particles homogeneously embedded therein wherein the particles comprise:

small particles, in particular plates or fibers with a random orientation and a length of 0.2-2 mm; and large particles with a dominant orientation, for instance 60-95%, of the said principal direction of the particles in a chosen product profile direction and a length in the particle principal direction of about 2-8 mm; preferably 4-6 mm; the large particles being larger than the small particles.

A specific embodiment has the characteristic that the large particles comprise plates or fibers and the particle profile direction extends in the main plane or the longitudinal length thereof.

In order to easily obtain the desired orientation of the fibers the embodiment is recommended wherein the fibers have a high tensile strength in their main direction.

According to the preferred embodiment of the invention, the particles possess a generally elongated form, whereby they may be designated as fibers.

A specific and very advantageous variant of the invention is characterized in that the particles consist predominantly of wood material and the plastic is a thermoplastic polymer material, in particular at least one polyolefin such as polypropylene or polyethylene or combinations or copolymer products thereof, wherein:

a. the transverse dimension of the large wood particles is preferably such that the ratio of the length in the principal direction of the particles to this transverse dimension amounts to a minimum of 4, but preferably lies in the range of 6-80;

b. the wood particles are present in a quantity of more than 50% by mass, but preferably from 70 to 90% by mass in relation to the mass of product;

c. the obtained composite profile product complies as a minimum with the following requirements relating to physical properties in:

tensile strength (MOR) in the profile direction: 40 MPa;
tensile modulus (MOE) in the profile direction: 4 GPa;
tensile strength (MOR) transversely of the profile direction: 25 MPa;
tensile modulus (MOE) transversely of the profile direction: 2 GPa; and
density of the material: 1000 kg/m$^3$.

The method of the invention herein provides a product that can be manufactured from wood without waste and, if desired, as a continuous process. The product of the invention not only possesses mechanical and physical/chemical properties corresponding to wood but also can be manufactured from basic wood which if necessary can be inferior wood or waste wood or waste plastic-based wood composite. The products can be classified as suitable for interior wood, exterior wood or construction wood purposes. The products according to the invention will hereinafter be designated as technical wood.

For this purpose particles with tensile strength such as wood particles, preferably originating from waste wood or wood waste, optionally together with suitable strengthening particles are predominately oriented and bound by means of a thermoplastic polymer binder, preferably formed of olefins, PVC, or similar well-known plastics, wherein the proportion of particles used is high relative to the binder polymer. The products of the invention are not mere fiber-filled thermoplastic material but instead are exceptionally wood-like material.

It is important that the method of the invention can be performed in a continuous manner. The method of this invention comprises the following essential stages of: (1) drying of the plurality of particles to obtain particles of low moisture content; (2) compounding; namely, the blending of components and formation of an agglomerate; (3) pushtrusion; namely, the transformation of the agglomerate into a profile; and (4) further processing including calibration of dimensions, cooling and finishing of the profile.

Each of these four essential stages can include one or more phases.

In the first stage, the wood particles which can be fibers, chips or flakes are intensively dried. Persons skilled in this art will be able to select suitable drying apparatus. One suitable method is to dry the wood particles in a continuous steam drying process where flue gases from an electrical generating plant is used. In this way, use of the residual heat energy, a high efficiency rate is achieved and the energy consumption of the entire production process can be lowered. The moisture content of the wood particles after drying should be no more than 0.5% by weight.

In the second essential stage of compounding or blending, the wood particles, the thermoplastic polymer and any conventional additives are brought together and mixed and thoroughly blended in a suitable compounder apparatus. The temperature in this stage of compounding is sufficiently high created by friction without any pressure to melt the thermoplastic polymer so that the polymer will be capable of uniformly blending with and encapsulating the wood particles. The hot blend may be at a temperature of about 180° C. is immediately cooled down to about 100° C. in the cooling blender where the agglomerate is formed. The purpose of the blending is to form a pre-mixed granulate or agglomerate without substantially adversely affecting the size and shape of the wood particles. The resulting product is an agglomerate that can be easily stored, transported and fed to the pushtrusion apparatus. The design of the impellers and rotation speed in hot and cooling blender is designed in such a way that minimum damage occurs to the fibers. After the agglomerate is made, it is then conveyed to a homogenizing silo for storage because the batch to batch process of blending needs to be mixed for an absolute constant feedstock. From out of the storage silo, the pushtruders are fed.

In the third essential stage of pushtrusion, the agglomerate is transformed into an initial profile or profile preform. For this purpose, the agglomerate is plastified and pushed through a die under high pressure. A double screw (twin-screw) multi-zone extruder with a modified screw geometry has been developed for this purpose. The agglomerate from the second stage is fed to a plastification zone where the agglomerate is heated up, as necessary, to soften the agglomerate up to working temperatures to insure a smooth extrusion. The apparatus is designed to enable a pressure-less zone where degassing can take place after the agglomerate has been plastified in the first part of the extruder.

After the plastification phase, the plastic-wood particle mass moves through the double screw extruder to the next zone where the mass is subjected to a degassing phase, where gases created by the heat and remaining gases are extracted, for example, by vacuum.

The next zone through which the plastic-wood particle mass passes is for carrying out the compression phase.

In the compression zone, further expulsion of gases/air remaining in voids, both inter and intrafibular, are pressed out and sucked back stream by the vacuum in the degassing zone. This must likewise take place under conditions wherein the fibers remain intact. In this compression zone, the main densifying takes place.

The compression of the plastic-wood particle mass after the degassing zone is very important to obtain the required density and ensure high quality of the profile product, as any remaining gases tend to form voids in the final product. By using a double screw extruder, the successful removal of remaining gases can be accomplished. A particularly suitable apparatus for this purpose is shown in U.S. Pat. No. 6,869,211 which is incorporated herein by reference. A vacuum pump is used on the extruder vent in the degassing zone.

The screw flights in the degassing zone are oriented forwards to avoid that, in this zone, the light weight wood particles and semi-melted mass of fibers and resin would enter the air stream of the vacuum and would be sucked out of the screw cavity into the same vacuum opening. From the intake section up to the degassing zone, the screw geometry has a compression ratio (volume reduction) from 2 α 4 to 1, more preferably 2.7 α 3.2 to 1, most preferred from 3 to 1. This enables the absorption of a sufficient volume of low density fiber compound mix in the pushtruder.

The next phase in the pushtrusion stage is the orienting phase wherein a dominant orientation of long particles in the compressed plastic material must take place under conditions such that the mutual position of the particles in the mixture is by and large retained, that is, the orientation proceeds along fluent flow lines, gradually and without such high shear stresses that there would thereby be a danger of thermal degradation. An orientation die is used for this purpose.

After orientation of the long fibers, the mass proceeds through the extruder die for the extrusion phase. The extrusion die is placed directly after the orientation die. After that, the mass proceeds to a shaping zone and a cooling zone. The shaping zone can be further subdivided into a part in which the flow is bounded and a "plug-flow" is formed, a compression zone in which the pre-forming of the profile takes place and a shaping zone in which the final forming of the profile takes place and is held constant over a certain length. The cooling zone is an essential part to ensure that the outer skin of the product is cooled down below the Vicat softening point, before the profile comes out of the mould in the second calibration and after cooling zone to maintain the shape of the profile.

The shaping zone wherein the mixture of wood particles and thermoplastic polymer acquires a fixed shape and dimensioning on the cross section perpendicularly of the flow direction, likewise takes place under conditions wherein the relative mutual position of the wood particles remains practically unchanged, for which purpose the material flows under pressure out of the mould head and remains at pressure in the cooling unit until the binding polymer phase has cooled to below the Vicat softening temperature at the outer layer of the product. After cooling a second calibration takes place after the cooled down product leaves the die set. A water cooling bath can be used for this purpose.

The complete die stage of transforming the agglomerate into a dimensionally stable profile is called "pushtrusion" and is the third essential stage of the overall process of the invention.

The final stage of the process involves a number of post formation phases: including a calibration or dimensioning phase where the size of the product in the direction perpendicular to flow is maintained after leaving the cooling die. A cooling phase follows. A tension control can be used to ensure the output and haul-off speed non stop under control at set parameters. Several additional optional phases can be introduced here including brushing and embossing to form desirable decoration on the product. Drilling of holes can also be carried out. Finally, the extrudate is cut into the desired lengths according to the intended purpose of the product.

There is no conventional extrusion in the process of the invention, since in this extrusion process, the melted mass, after leaving the extrusion head and in the first part of the cooling die, the melted mass is under high pressure but by leaving the cooling die, the material is practically pressureless. This is contrary to standard extrusion processes where the material at the outer layer is not cooled down in the die sets under full pressure and, therefore, the desired plug flow is intentionally not created and maintained. Applicants push the material in plug flow through the cooling die by maintaining the pressure.

There is also no pulltrusion in the process of the invention since pulling forces on the shaped product directly after leaving of the cooling die would cause internal damage or breaking of the complete profile that is still above the Vicat softening temperature inside. In the consolidation phase where the product is further cooled down in the core of the profile even a slight compression force in the profile is realized to ensure complete cohesion in the product.

The method according to the invention involves a shaping process under continuous significant overpressure, wherein the material does not flow but is pushed forward as a plastic plug flow through orientation, shaping and cooling phase. This method is therefore designated with the name of pushtrusion.

The obtained product on the basis of wood particles and plastic, called technical wood, is fully recyclable due to the fiber binding by means of a thermoplastic polymer. It will be apparent that recycled polymers, e.g. polyolefins, polystyrenes and the like, can also be used as fiber binders. The terms polyolefins and polystyrenes are intended to include copolymers as well as the homopolymers of olefins and homopolymers of PVC or ethylene or propylene. The preferred thermoplastic resin is polypropylene.

Additives can also be added during the compounding stage, whereby properties are given to the technical wood which surpass those of natural wood, particularly when fast-growers such as firs, pines, birches and poplars are used as the starting material.

Examples are known from the patent literature wherein plastic products resembling wood are manufactured but wherein the mechanical properties that are obtained according to this method of the invention are not obtained.

The products produced according to the known prior methods have limited uses, e.g. to floor planking, covering, fence palings, wall elements, etc., wherein the wood part is considered merely as a filler:

EP-A-0 114 409, E.I. Du Pont de Nemours, 1994
U.S. Pat. No. 5,030,662, A. K. Banerjie, 1991
U.S. Pat. No. 4,866,110, Chang Y. Lee, 1989
U.S. Pat. No. 5,082,605, J. G. Brooks et al, 1992
NL-A-77 04265, Lankhorst Touwfabrieken, 1978
WO-A-90/08020, Polywood Patent AB, 1990

BRIEF DESCRIPTION OF DRAWINGS

The invention will now be elucidated with reference to the accompanying drawings, wherein:

FIG. 1 shows a schematic representation of a flow diagram illustrating the blending stage according to the invention;

FIG. 2 shows a schematic flow diagram of the pushtrusion stage according to the invention;

FIG. 3 shows a schematic flow diagram of the final stage of the present invention;

FIG. 5 is a side view of the end part of the pushtrusion apparatus used with the assembly of die parts for orientation, shaping and cooling.

DETAILED DESCRIPTION OF INVENTION

Figure 4B:
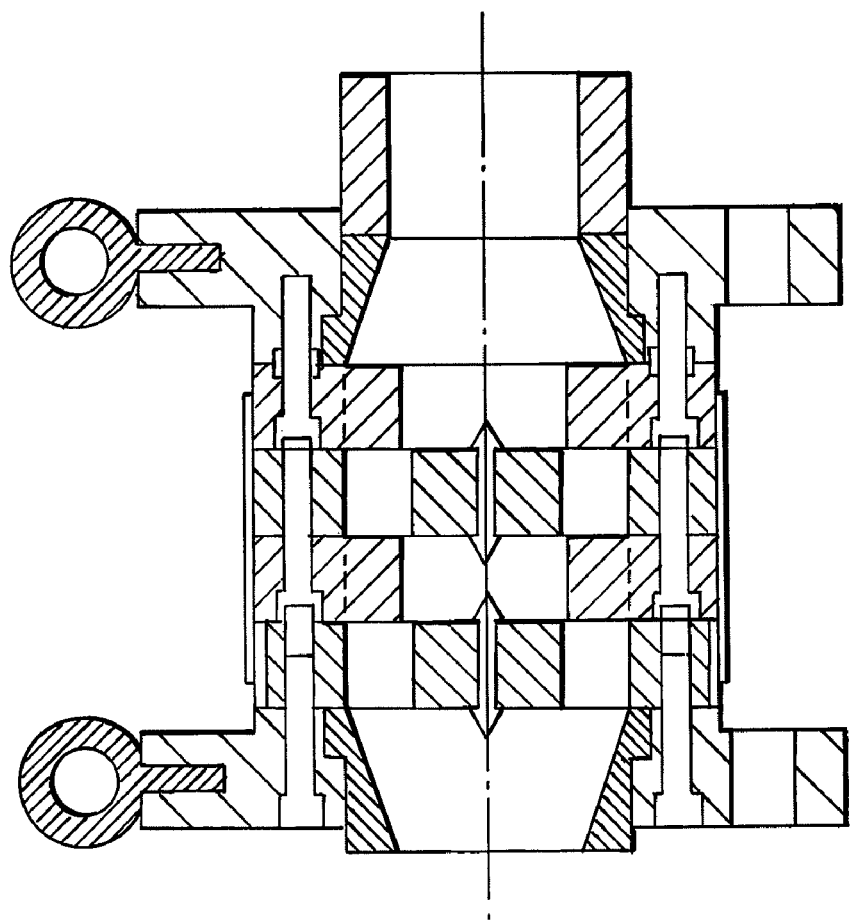
FIG. 4B is a cross section of the die shown in FIG. 4A.

FIG. 1 illustrates the compounding stage of the method of the invention; namely, blending of pre-dried wood particles, thermoplastic polymer and any additives to form a blended mixture. Any suitable conventional, but modified, blender can be adapted for use to carry out the invention care being taken that the blending action does not result in undue break up or fracture of the wood particles. It is important that the size and dimension of the wood particles not be adversely impacted. After blending, the resulting product is termed the "agglomerate" can be stored and transported to the location of the extrusion apparatus. The agglomerate mixture can be further blended in a homogenizing blender for storage and then transported.

FIG. 2 illustrates the flow of the agglomerate mass through the pushtrusion apparatus and the location of the various zones.

FIG. 3 illustrates the finishing operations that are typically carried out whereby the final profile product is obtained.

Blender

The function of the blender, as for instance of the type of MTI M850S/KMV 3000 or Hemschell FM 1200/KN 2200, is to encapsulate particles, in particular wood fibers, in the liquid thermoplastic in the compounding stage. This must take place such that the wood fiber is completely enclosed with polymer, however, without the fiber effectively being shortened or damaged because of fiber breakage. The wood fiber may, however, split longitudinally. This situation is achieved by the polymer melt wetting the fiber. Due to the relatively strong adhesion properties of the melt in relation to the fiber the latter are carried along and dispersed homogeneously further on in the melt phase. In the blender, the thermoplastic resin is heated so as to be above its melting point to create full dispersion of the wood particles in the resin. Adapting the blending blade geometry prevents too intensive a cutting action being applied to the mixture, as is usually the case with, for instance, a standard compounder. A conscious choice has been made by applicant for a long blending path instead of a short sharp one, whereby the wood particles are handled carefully while a homogeneous dispersion nevertheless occurs. At this stage in the compounding, there may be included a phase where additives can also be added such as extrusion aides, flowing agents, compatibilizers, as well as other substances well known in the art to contribute their expected functions.

The adhesion between wood particles and polymer melt is so great and adheres such that optional further additions can be made to the mixture without breaking the adhesion between polymer and wood particles.

Also during the compounding stage, there may be included a phase where optional reinforcing fiber on a basis of cellulose, such as flax or hemp, or mineral or glass fiber, mica plates or the like can be carried along in the above path.

FIG. 2 is a highly schematic representation of the pushtrusion apparatus of the invention. This comprises a plastification zone, a degassing zone and a compression zone in a double screw extruder. This is followed by an orientating zone, a product shaping zone and a cooling zone. The orientating die has spiders through which can pass the plasticized mass, in which fibers with tensile strength are incorporated. The long fibers have a length predominantly in the range of 2-8 mm, preferably 4-6 mm. In order to give these fibers the desired orientation, that is, the longitudinal direction designated, the continuous channels and subchannels are designed in the orientating die. Spiders and subspiders are chosen and positioned in such a way that passing melted fibrous material through them will result in obtaining a strike or ironing effect orientating the fibers without harming them.

Figure 4A:
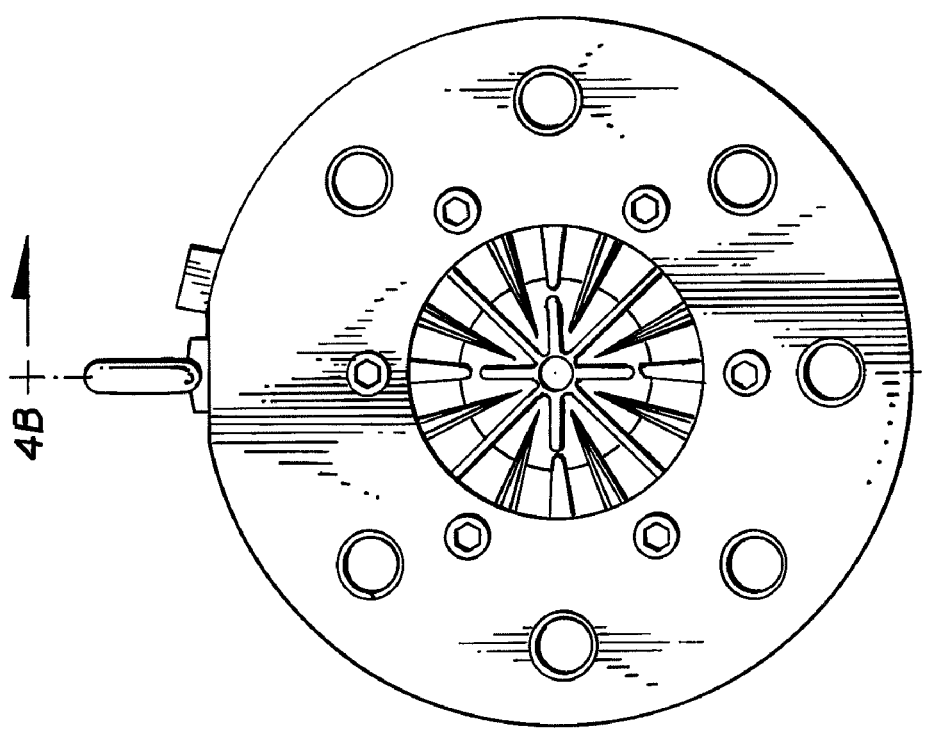
FIG. 4A shows a side view of the orientation die apparatus with which a product according to the invention can be manufactured.

FIGS. 4A and 4B show the details of the orientating die.

By successively compressing, decompressing and degassing under vacuum the wood fiber-thermoplastic mixtures by means of the chosen screw geometry, air and gases are expelled, both from the mixture and from the pores in the fiber. Any remaining air and resulting gases can be removed in the initial part of the compressing zone and pushed backwards to the degassing zone where vacuum will remove these gases.

Double Screw Extruder

The pressure required to press the mixture through the distribution head (to be described below), and the orienting means is produced by a double screw extruder which functions as displacement pump. High pressures can be realized without any significant effect on particle shape and dimensions. Moreover, since large shearing forces are practically absent, the desired pressure increase can be realized without excessive thermal load and degradation of the mixture. It is important to prevent voids in the wood capillaries to prevent take up of moisture in the finished product by exposed conditions. A special screw design for the extruder for this new technology is described in U.S. Pat. No. 6,869,211, the entire disclosure of which is relied on and incorporated herein by reference.

Adaptor and Orientating Die

As shown in FIG. 5, the adaptor (1) is a necessary "interface" between double screw extruder and orientating die section (2). The laminar flow pattern from the double screw extruder which acts as a rotating displacement pump must be converted to a plug flow.

Starting at the adaptor, that can have various bores to adjust required extrusion pressure for each profile, the material flows in a "plug flow manner" along a labyrinth of spiders (orientating knives) is such a way that in the formed channels the long fibers in the material flow will be orientated by the contact of the spiders; see FIG. 4A.

The lay-out of the channels in between the spiders is made in such a way that at all times, by the cohesion of the material (melted compound) a plug flow is created. The system is maintained so that there is the same speed of material flow in all sections.

Depending on the product and velocity of the material flow, one or more orientation spider dies can be added after each other in the spider housing.

The particle orientating means must be supplied with a constant flow of mixture which in quantity and speed is distributed equally over the flow surface of the orienting means. This is done in order to prevent blockage and turbulence as a result of speed differences after each phase of the particle orientation. The adaptor thus initiates the required plasticity within the flow profile. The plug flow can be optimized:

low friction surface configuration
temperature settings of the die sections and spiders.

Bounding Zone

As more or less spiders have been applied in the orientating die (2) as shown in FIG. 5, it is crucial under maintaining or slightly increasing pressure, that the semi individual compound strips (bundles or sections) will come together and fused in fusion zone 3 while maintaining the plug flow towards the compression and pre-forming die zone.

Compression and Preforming Die

Coming out of the fusion section some more compression is maintained in the first step to form the mass to the required product shape. This compression is needed to keep the plug flow in tact and takes place in the compression zone (4) in FIG. 5.

Product Forming Die

In this section (5) shown in FIG. 5, the more or less final shape of the product is created while again keeping the plug flow in tact. The constant plug flow in the various sections is crucial as difference in speed in the molten material flow would disturb the fiber orientation.

Orientating Die

The orientating die (2) consist of a plurality of spiders in the flow direction. The total through-flow surface per open area is mutually equal. Per spider section the amount and position of the spiders is chosen in such manner that in the plug flow volume of the fiberous melt, fibers slide along the spiders. By reducing or adding more spider sections the percent of fiber orientation can be influenced. When short fiber with a length of 1-2 mm and an L/D ratio of 4 are guided along a spider, little or no orientation will occur.

Mould Head/Calibrating Device

In order to make a two-dimensionally shaped endless product from the "wood mixture" with the oriented particles a mould head and a cooling final forming device is necessary. In contrast to the typically used extrusion shaping process, the mould head and a cooling and main calibration die (6) of this invention are constructed integrally in the pushtrusion process, since the pushtrudate may not be pulled or have pressure exerted thereon in lengthwise direction.

Cooling Die Section

As the molten material as such has little or no bonding strength because the resin/adhesive binding effect at that stage of the process is too low to create some stability at this point, the melt has to be cooled down by pushing the formed product melt through a cooling die creating some stiffness at the outer surface before the pushtrudate comes "in the open" for further cooling and calibration.

The outer surface of the product is below the Vicat melting point at the exit of the die and the maintained pressure at exit is reduced to zero.

An essential condition for obtaining technical wood is that after shaping, the mixture is cooled under pressure at the outer surface to below the Vicat softening temperature of the thermoplastic binder. This consolidation process is necessary to prevent delamination and matrix failure.

In order to further prevent delamination and matrix failure in the cooling final forming section the surface of the cooling die has a sandblasted finish to realize less contact friction. The outer part of the product meanwhile which is cooled to below the Vicat softening temperature in the first calibrating cooling phase provides the necessary matrix support for that part of the product, the material core, which is still above the Vicat softening temperature.

Process Parameters

It will be apparent that in the pushtrusion process many parameters can be distinguished which all have their influence on the creation, quality and properties of the technical wood.

The process parameters can be sub-divided as follows:
(1) Variable parameters, being adjustable parameters which can be varied on-line.
(2) Adaptable parameters are set once, subject to the type of technical wood and the desired product section.

Variable Parameters (1) The variable parameters can be further sub-divided into the following categories:
  a) as they also occur in the known blending/extrusion process:
    temperatures, for instance set temperature profile in the compounder or, of the screw cylinder, temperature of mould head,
    screw rotation speed, with twin-screw extruder: the filling level by means of dosaging,
    pressure, interactive,
    degassing, absolute pressure of the vacuum,
    through-flow surface adjusted by means of the number of spiders or spider rings and/or temperature profile of the various sections in the die set,
    temperature of the particle orienting provision, temperature of the pre-calibration cooling section, Adaptable Parameters screw geometry,
manner and position of dosage,
degassing zones and number,
L/D ratio of the extruder,
number of orientation plates,
flow resistance in the mould head cooling/pre-calibrating device,
position and active length of the resistance,
friction reducing surface in the pre-calibrating device.

Example of the Method and the Mechanical Properties of Obtained Technical Wood According to the Invention The method is performed in a pushtrusion apparatus as described above with a capacity of 200 kg per hour.

The composition of the mixture is as follows:

72% by mass pinewood, length of the fibrous particles 0.4-6 mm,

L/D=4, moisture content 0.5% by mass

24% by mass polypropylene. MFI=15 dg/min, (230/2, 16)

4% additives.

The most important process parameters are as follows:

temperature profile in the range 160-200° C.

rotating screw extruder pressure 200 bar vacuum 20 kPa.

Measured Mechanical Properties of the Technical Wood

Four samples were measured wherein the following results were obtained in respect of the length orientation of the wood particles:

| Tensile strength tests (ISO 527) and standard deviation | | |
|---|---|---|
| Tensile strength (MOR) in profile (L) direction: | 72.8 MPa | 2.4 MPa |
| Tensile modulus (MOE) in profile (L) direction: | 7.320 GPa | 0.440 GPa |
| Tensile strength (MOR) transversely of the profile direction (T): | 59.5 MPa | 2.4 MPa |
| Tensile Modulus (MOE) transversely of the profile direction (T): | 4.100 GPa | 0.190 GPa |

Addition of 10% glass or flax fiber with a length of 4 mm and L/D 150 to 400 gives values about 25% higher than shown above.

Another embodiment is characterized by the addition of at least one additive for obtaining desired properties, which additives can be is added to the compounder during blending, heating during manufacture of the agglomerate The said desired properties of the skin surfaces may relate for instance to the adherability of paint, lacquer and glue.

As already noted, the product according to the invention lends itself very well for manufacture by means of a process which can best be described as pushtrusion. In this respect the invention likewise provides a pushtrusion apparatus for manufacturing a product of the above specified type, which apparatus comprises:

an extruder operating under pressure for plasticizing a mixture consisting substantially of a thermoplastic polymer and wood particles with tensile strength, which particles are mixed with the plastic beforehand in the compounder, and pressing the plastic mixture to the outside via an outlet to the adaptor of the die set;

and referring to FIG. 5, an adaptor to extruder (pushtruder) (1) with adjustable bore hole to adjust pressure and further transporting the plastic mixture substantially as a plug flow;

orientation die (2) further guiding the mixture, comprising a labyrinth of spiders or orientating knives forming substantially parallel channels through which the plastic mixture can flow and where the orientation knives effect the random position of the longer fibers by the effect of drawing the fibers in the orientation of the profile direction;

a fusion zone (3) for fusing material and maintaining plug flow;

a compression zone (4) for preforming the product;

an orientation zone; a product shaping zone; (5) and a cooling zone (6) with pre-calibration of the product.

A mould head that has an internal opening that is shaped in principal from round to oval connects onto the desired cross sectional form of the product;

such that the principal direction of the particles corresponds with the longitudinal direction of the mould head and the profile direction of the product;

which mould head is sufficiently long and has a temperature curve in the longitudinal direction such that at the end of the mouth the product at the outer surface has cooled to below its Vicat softening temperature.

As already discussed, the adhesion of lacquer, paint and glue can be enhanced by mechanical means, for instance due to a certain porosity and protruding fiber. Another embodiment which achieves the same effect in chemo-physical manner is characterized by an additive with a desired influence on chosen properties of the product and belonging to at least one of the following classes:

enhancers of adhesion between particles with tensile strength and matrix polymer (class H), enhancers of the properties of the surface of the product, particularly in respect of coatings or adhesives for applying in sandwich structures (class O), enhancers of the pyrogenic properties (class P), enhancers of the particle durability (class D).

It is further noted in general that binders can also be added to the basic plastic in order to improve the adhesion between fibers, plastic and other additives. The adhesion to the product according to the invention of paints and lacquers based on acrylics can hereby also improve.

The use of coloring agents or pigments in the mass can provide the advantage that a uniform product is obtained.

An additional coating can be applied to the visual side of the product. Such a coating can have, for example, an extra-stable color, an increased UV-resistance or resistance to dirt and weather influences.

In contrast to the above-mentioned prior art, the invention provides a product which lends itself for processing and treating as wood. The following considerations are paramount in this respect.

The product according to the invention can have a thermal expansion similar to that of natural wood and also has a similar strength and stiffness with a comparatively great toughness and excellent cracking strength. The product can display fire characteristics which, by making use of environmentally-friendly additives, can be at least the equal of the fire characteristics of normal wood and which when it burns may not produce any more smoke and harmful substances than does normal wood. At a specific density of 1150-1250 kg/m$^3$, the process and the required raw materials and additives may not exceed the price of normally processed wood.

During the process, the products can be brushed and/or embossed to create a wood like finish but also improves the adhesion of paint when paint is applied.

The product according to the invention can be worked with normal tools and normal wood processing machines. In the usual manner of wood, it can be nailed, sawn, screwed, glued, painted and lacquered. Because of their excellent resistance to climatological conditions such as moisture, sunlight with ultraviolet component, temperature changes, etc., the products made by the method of this invention can be used for indoor and outdoor applications. Thus, the products according to the invention are better suited for recycling after use than natural wood and are superior to wood in respect of moisture absorption, rotting and mildew resistance, termite resistance, paint durability and non-slipperiness.

The invention claimed is:

1. A method of manufacturing a polymer-based composite profile comprising a polymeric mass containing a plurality of wood particles embedded in said polymeric mass, said method comprising:

bringing a plurality of dried wood particles and a thermoplastic polymer and optional additives together to form a plastic-wood particle mixture wherein said wood particles amount to 70% to 80% by weight of said plastic-wood particle mixture;

blending said plastic-wood particle mixture in blending apparatus at a temperature sufficiently high to melt the thermoplastic polymer in the mixture so as to be capable of uniformly blending with the wood particles, followed by encapsulating the wood particles to form a blended plastic-wood particle mass containing encapsulated wood particles constituting an initial agglomerate;

transforming the initial agglomerate into a composite profile by a pushtrusion process comprising subjecting the said agglomerate to the action of a double screw multi-zone extrusion apparatus wherein in a first stage the initial agglomerate is subjected to plastification to soften said agglomerate as a result of melting of the thermoplastic polymer that is present in the agglomerate and which is to ensure smooth extrusion;

thereafter in the next stage subjecting said softened agglomerate to a de-gassing zone in said extrusion apparatus, whereby gases that are still present in the agglomerate or that are formed by heat are extracted by vacuum, thereafter in the next zone of the extrusion apparatus subjecting softened and degassed plastic-wood particle mixture to a compression phase to further expel gases and to laterally compress the wood cells in the wood particles in order to obtain a high density to thereby form a high-density compressed plastic-wood particle material;

thereafter in the next stage subjecting said compressed plastic-wood particle material to an orientation action that is effected by the passage of the plastic-wood particle material through an orientation die part in said extrusion apparatus under pressure so that the compressed material is pushed under pressure as a plastic plug flow in said extrusion apparatus and through said orientation die to orient the wood particles in extrusion direction; pushing the resulting softened, de-gassed, compressed and orientated plastic-wood particle material under pressure through an extruder die and then to a shaping stage under pressure in which a plug-flow occurs, preforming the profile in a compression zone and final forming of the profile takes place to shape the plastic-wood particle material into a profile that either becomes a solid profile or a hollow profile;

and pushing the profile to the last part in the extrusion apparatus under full pushtrusion pressure where there is a cooling state to thereby cool the profile below the Vicat softening temperature at the outer layers of the profile to obtain said composite profile;

said wood particles in said composite profile comprising small particles with a random orientation and a length of 0.2 to 2 mm; and large particles with a dominant orientation in the longitudinal profile direction with a length of 2 to 8 mm, the largest particles being larger than the small particles.

2. The method according to claim 1 wherein after the agglomerate passes through the double screw extrusion means degassing the agglomerate whereby air and process gasses are extracted from said agglomerate.

3. The method according to claim 2, wherein the plastic-wood particle mass passes through a compression phase and compressing the plastic-wood particle mass to mechanically press out remaining gases and air from voids and fiber capillars to avoid any open voids to obtain a desired density.

4. The method according to claim 3, wherein the plastic-wood particle mass subsequently proceeds through orientation means whereby wood particles are oriented so that long wood fibers contained in the wood particles are oriented in a profile direction.

5. The method according to claim 1, wherein the plastic-wood particle mass proceeds through extrusion means including a shaping zone and a cooling zone to cool the plastic mass below the Vicat temperature at outer layers of the plastic mass under full pressure to form a final plastic-wood particle composite profile.

6. The method according to claim 1, wherein the blending takes place to such an extent that the wood particles are completely enclosed with the thermoplastic polymer.

7. The method according to claim 1, further comprising initially drying said wood particles.

8. The method according to claim 1, wherein any one of extrusion aids, flowing agents, compatibilizers, or additional reinforcing fibers are added when the thermoplastic polymer and the wood particles are blended together.

9. The method according to claim 1, wherein the wood particles comprise:
small particles with a random orientation and a length of 0.2-2 mm, and
large particles with a dominant orientation in the profile direction of the chosen product direction and having a length in the particle principal direction of about 2-8 mm.

10. The method according to claim 9, wherein the large particles are plates and the particle principal direction extends in the main plane thereof.

11. The method according to claim 10, wherein the plates have an at least more or less isotropic tensile strength in their main plane.

12. The method according to claim 1, wherein the composite profile has a tensile modulus in profile direction of 4 GPa or higher.

13. The method according to claim 1, wherein the composite profile has a density of 1000 kg/m$^3$ or higher.

* * * * *